Nov. 1, 1938.  A. H. J. DE L. SAINT GENIES  2,135,396
OPTICAL REPRODUCTION OF LENTICULATED OR GOFFERED FILMS
Filed June 25, 1936    3 Sheets-Sheet 1

INVENTOR.
Anne Henri Jacques
de Lassus Saint Genies.
BY
Stone, Boyden & Mack
ATTORNEYS.

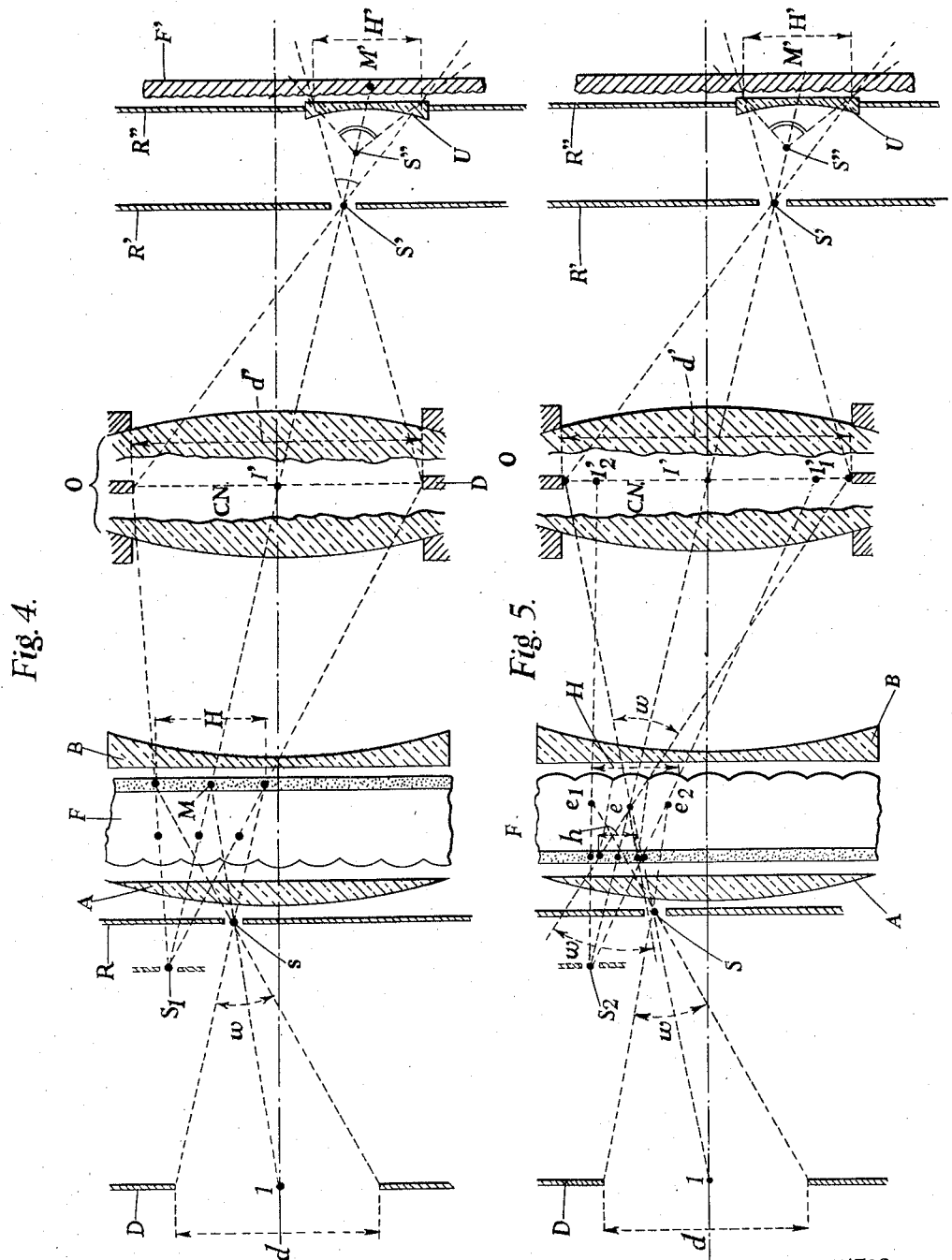

Nov. 1, 1938.   A. H. J. DE L. SAINT GENIES   2,135,396
OPTICAL REPRODUCTION OF LENTICULATED OR GOFFERED FILMS
Filed June 25, 1936   3 Sheets-Sheet 3

INVENTOR.
Anne Henri Jacques
de Lassus Saint Genies.
By Stone, Boyden & Mask.
ATTORNEYS.

Patented Nov. 1, 1938

2,135,396

UNITED STATES PATENT OFFICE 2,135,396

OPTICAL REPRODUCTION OF LENTICU-LATED OR GOFFERED FILMS

Anne Henri Jacques de Lassus Saint Genies, Versailles, France

Application June 25, 1936, Serial No. 87,306
In France June 27, 1935

13 Claims. (Cl. 88—24)

The present invention relates to a new system of optical copying of lenticulated or goffered films, which ensures the correct transmission with any enlargement of all the elementary beams of the original to the lenticulated or goffered copy film. It also allows of imparting to the copy any desired value of the convergence of its elementary beams, and copying the originals, the lenticulation or goffering of which faces the illuminating source, as well as those facing in the opposite direction, and, finally, modifying at will the aperture angle of the elementary beams of the copy.

These results are obtained, according to the invention, by the use of movable slots which are displaced in close proximity to the two films facing each other, or of equivalent devices, which distribute the luminous beams by continuous scanning over the parts corresponding at any moment on the two films and which may comprise movable optical devices.

The other features and the advantages of the present invention will be explained in the following with reference to the accompanying figures and are defined in the appended claims.

Methods of copying are already known in which the original is illuminated by one or more sources, the contour of which corresponds to its zone of natural convergence. A slot is displaced in this zone, causing entire macroscopic images to appear, that is, illuminating always the whole extent of the original film. Another slot, which is displaced in a homologous manner with respect to the copy film, ensures the recording of entire combinations of microscopic images by also acting on the whole extent of the copy. In certain cases, use is made at the same time of additional optical systems arranged in proximity to the two films.

These methods present certain drawbacks which the present invention avoids. It is seen, for instance, that in these known methods, the copying optical system always works with a partial aperture and in regions which are always different; if, under these conditions, it is not strictly corrected in the same manner at all points, the successive macroscopic images on the copy film are not superposable among themselves. A perfect correction is all the more difficult when use is made of auxiliary optical systems which is the usual practice.

Under these conditions, the methods which are derived from the general method mentioned above lead to results which are far from being satisfactory as regards the correct reproduction of the films.

The present invention has for an object to provide a method of copying which is capable of producing correct copy films, whether or not use is made of convergent or divergent additional optical systems in proximity to the films during the copying operation.

According to the invention, the copying optical system is constantly made to work with the whole of its utilizable aperture, and no movable or fixed slot acts to reduce this aperture, and there are caused to appear at any moment on the original film, and at the same time there are recorded at any moment on the copy film, homologous fractions of the macroscopic images of these films. To this end, two relatively narrow slots are employed, which are preferably arranged in proximity to the two films, one between the source and the original film, the other between the copying optical system and the copy film; these slots are moved relatively to films with homologous movements.

They act substantially as slots of shutters with screens, relatively to the films, and not as source and objective shutters, as formerly, and this results in the distribution of the elementary beams in time and in space being effected in a very different manner from that which is observed in the known arrangements. In each elementary chamber of the original film and in each homologous elementary chamber of the copy film, the parts of the emulsion which correspond to the different monochromes or to the different points of view are illuminated successively, but, contrary to the known arrangements and according to the present invention, it is not the same parts which are illuminated simultaneously in the adjacent elementary chambers; there is found to be, so to speak, a certain phase displacement between the adjacent elementary chambers.

In the case of the colour film, for instance, instead of simultaneously illuminating all the parts of the emulsion which correspond to the red, and then, again simultaneously, all its fractions which correspond to other monochromes, different parts of the different monochromes are illuminated at the same moment in adjacent elementary chambers simultaneously concerned and situated in the homologous zones of the films.

On the other hand, it will be seen in the following that the appearance and the recording of the complete elementary images for every elementary chamber of the two films takes place for smaller displacements of the slots, the nearer the latter are to the film.

The method assumes that the lenticulations or gofferings of the films are linear and preferably parallel; the relative movement of the screens and of the films may take place either with the immobility of the film or with that of the screens.

In the accompanying drawings which are diagrammatic and given by way of example, Fig. 1 illustrates in section through the optical axis of the system, on a greatly enlarged scale for the films, the mechanical and optical process of the invention.

Figs. 4 and 5 are modifications of Fig. 1, and

Figure 1:
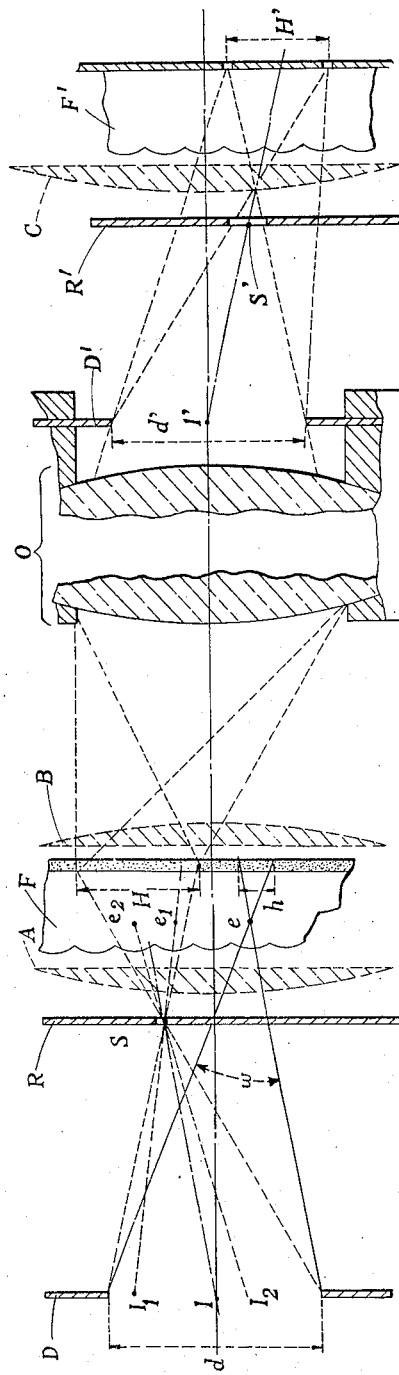

In Fig. 1, F and F' are, on a greatly enlarged scale, fractions of the original and copy films; O is the principal optical system diagrammatically represented by its two outer faces, R and R' are the screens or shutters which are movable relatively to the films and bear the slots S and S' parallel to one another and to the direction of lenticulations or gofferings; these slots simultaneously illuminate the homologous zones H and H' of the gelatinized faces of the two films; D is a guard having the contours of the zone of natural convergence of the original film; $d$ is the aperture which defines the active surface of the source, D' is the real image of D furnished by the assembly of the optical system constituted by the principal optical system O and if necessary the additional optical systems A and B enclosing the film F.

Considering an elementary chamber of the film F, $e$ is the point which defines its optical centre and $h$ is the zone of the silver layer belonging to this chamber and constituting its complete elementary image. It is seen that if D is directly situated in the zone of convergence of the film F, or if an additional optical system A is employed, in the known manner, for placing a virtual or real image of this guard D at the finite or infinite positive or negative distance of natural convergence from this film, the elementary image $h$ of the chamber $e$ is entirely swept by luminous beams emanating from the zone $d$ of the guard D when the slot S of R traverses the dihedron of light of aperture $\omega$ bearing on $e$ and on the edges of the guard D as viewed from F.

The same is the case with all the elementary chambers of the film F successively impinged on by the light which passes through the slot S during its movement relatively to this film. It is also seen that, at a given moment, several adjacent chambers, such as $e_1$ and $e_2$, etc., in the figure, receive the light proceeding from $d$ to produce luminous impacts according to the directions $I_1e_1$, $I_2e_2$, etc. The greatly enlarged scale of the film F only permits of showing in the drawings two of these adjacent chambers as being impinged on by the light. It is seen that there is, in reality, a large number of simultaneously illuminated chambers, the number thereof being greater, the further S is from the film.

The slot S should preferably be rather narrow; its distance from the lenticulations or goffering of F, which may be only several millimeters, should preferably be sufficient to appear at infinity relatively to the diopters of these lenticulations and to give on the gelatinized layer, images which are as well defined and as small as may be desired.

The principal optical system O, which always works at its largest utilizable aperture, that is, without occultation of any useful luminous beam by its mountings, produces in combination, if necessary with the convergent or divergent additional optical systems A and B, such as are known to be commonly employed, a real image D' of the aperture $d'$. A guard D' preferably materializes this image, said guard comprising a wide diaphragm united with the principal optical system O. The system O, if necessary, combined with B, may produce an image H' on the copy film of the zone H, illuminated on the film F. H, H' are homologous and conjugated zones of the macroscopic images of each of the films.

The diagram of Fig. 1 shows at what point it is suitable to place the slot S'; the luminous beam which joins the centre I of the zone $d$ of the slot S in the plane of the figure, necessarily passes, after refraction, if necessary through A, through the centre of the zone H. The path of this beam has for conjugate, in the optical system OB, a line bearing on I' (image of I and centre of D') and on the centre of H'. On this line there is formed an image of S, more or less diffracted by the original film, and it is with the most luminous part of this image, or in its close vicinity in front or behind, that the slot S' of the screen or shutter R' should preferably be made to coincide.

The slot S' plays a part symmetrical with that of the slot S and allows the illumination and the correct recording on the film F', by elementary chambers of this film, of microscopic images. As has been seen above, the assembly of these microscopic images of the zone H', considered at a given moment, would be unable to constitute a monochrome assembly for example, since at each moment, each of the elementary chambers of the copy receives, exactly as on the original, only a part of all the useful luminous beams.

The two slots S and S' of the two screens R and R' are displaced simultaneously, relatively to the films; they always remain substantially conjugate optical systems to one another, as has been explained above, whatever their respective distances from each of these films. In this manner, the correct copy of the film F is obtained on the whole film F', by simultaneous sweeping of the whole extent of the two films; the zone of natural convergence of the film F' is, under these conditions, defined by the aperture $d'$ of D'.

It is understood that, in the known manner, a convergent or divergent additional optical system C, arranged in proximity to the film F' between the shutter-screen R' and the film, may modify the distance of natural convergence given to this film both in magnitude and in direction and may fix it at any finite or infinite positive or negative value.

Figure 2:
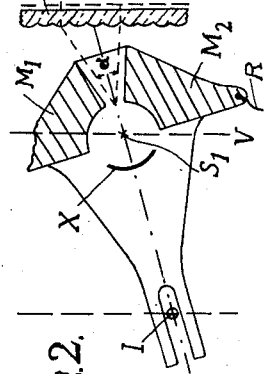
Fig. 2 illustrates one form of the slots which admit the light to the films.

In Fig. 2 there has been illustrated, by way of modification, a device replacing the guard and if necessary connected to the screen R or R' for illuminating the films. On the side of the original film the luminous source itself may be placed at $S_1$ to coincide with the illuminating slot. $S_1$ may be, for instance, a narrow, more or less diffusing element which receives a luminous beam projected thereon by a condenser, or the metallic filament of an incandescent lamp, if desired provided with a reflector X; the member supporting the whole may present a dihedral aperture of angle $\alpha$ delimited by the opaque lateral parts $M_1$ and $M_2$ and may have an extension guided by the fixed axis I. This member, which is rigidly connected with the screen R and carried along thereby, slides relatively to the film along the path $S_1V$ parallel to the film F. The axis of the dihedron of aperture is more approximate to $\omega$, the nearer $S_1$ is to the film F passes constantly through the centre I of the zone $d$ defined above.

Figure 3:
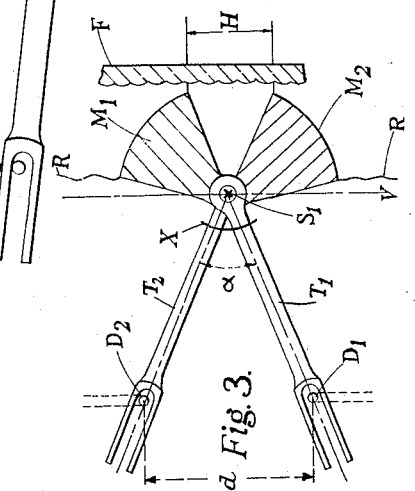
Fig. 3 shows a modification of the construction shown in Fig. 2.

If, however, the approximation effected by this device, which gives at $\alpha$ a constant value, cannot give satisfaction, the two parts $M_1$ and $M_2$ are articulated preferably on the axis itself of $S_1$ as shown in Fig. 3, each part having a separate extension $T_1$, $T_2$; these two extensions, shown in dotted lines, are guided by the fixed points $D_1$ and $D_2$ which correspond to the edges of the guard D not otherwise materialized. Similar devices may be arranged in front of the copy film.

It is seen that it is possible to effect the copying of lenticulated films by contact, by turning the two lenticulated faces towards the luminous source and by effecting with a single movable screen R, or with a single device of Fig. 2, their common illumination.

It is clearly comprehensible that no change is made either in the principle or in the result characterizing the present invention, if, for illuminating and furnishing two homologous zones H, H' with macroscopic images, the slots S and S' are rendered immovable with the copying optical system. Preferably on the principal axis of this optical system, and if, relatively to these slots, it is the films F and F'' themselves which are moved in their planes of conjugated translational movements, orthogonally to the parallel directions of the linings of their gofferings. The guards D and D' then execute suitable movements relatively to the fixed slots S and S'.

The result of this, in the case of cinematographic films in particular, if the films are lenticulated transversely to their length, and if the distance of convergence of these films is infinite or, at any rate, very large, is that the printer may function as a continuous printer like the optical printers which are used for the printing of sound tracks for example.

In these printers, the two films unwind with uniform movements and in opposite directions and are illuminated through the transverse slots S and S', which are immovably arranged, as has been stated above, in the same way as the guards D and D', without it being necessary to make use of additional optical systems A and C.

It is obvious, again, that the method is not altered and remains applicable in the case where the copying optical system O is composed of two systems, one projecting the image of the zone H of the lenticulated original film on an intermediate screen, and the other system resuming the projection changing at any moment on this screen, in order to record it on a zone H' conjugated with H of a lenticulated copy film.

In the case of Fig. 1, it has been assumed that the axes of the elementary beams of the original converged towards a zone situated in front of the lenticulations. It may be shown, by reference to the upper part of Fig. 4, that if its zone of convergence is situated on the side of its non-lenticulated face, towards the copying optical system, no change has to be made in the relative arrangement of the different members which preserve the same functions.

It is known that in all cases of copying by projection, an additional lens A, placed in proximity to the film F on the side of the source, must give, for the guard D, an image D' of aperture $d'$ formed in the zone of convergence of the original, and that if this image is not correctly situated with respect to the copying optical system, another additional lens B may be placed in proximity to the film F, on the side of the optical system O, in order to situate it in the plane of D' in Fig. 4 and chosen for the optimum utilization of the optical system O.

In the case of negative natural convergence illustrated in the upper part of Fig. 4 of the accompanying drawings, the source S, viewed from a point of view taken on the side of C. N. (natural convergence) appears to be replaced by its image $S_1$ furnished by one or both of the additional lenses A and B. Similar triangles of apex $S_1$ have for bases, on the same side of this apex $S_1$, on one hand, the image of the zone H (as is possibly furnished by B and very close to H) and, on the other, the real image D' of D (furnished on the side of the optical system O by A alone or by the combination of the two additional lenses A and B, according to whether use is made of one or both of these lenses).

It is therefore seen that the movable slot S does not cease in all cases to canalize correctly the luminous beams which really emanate from the active surface of the source delimited to the aperture $d$, in order to admit them at any moment to the zone H of the original film.

To simplify the drawings, the geometrical outline of the luminous beams supposes that the lenses A and B, the film F and the system O are infinitely thin, and the paths of these beams are not broken at the different faces of separation of the centres of different indices.

It then appears clearly that the arguments made with reference to the successive and methodical sweeping of the elementary chambers of the original film by the luminous beams canalized by S towards the film in the case of positive convergence must be identically repeated in the case of negative convergence, but by considering the dihedron of apex $S_1$, the image of the dihedron of apex S.

The same argument also applies in the case of Fig. 1, even if the natural convergence of the film F is positive, but if the use of one or both of the lenses A and B is, in the known manner, rendered necessary.

In the case where, according to the lower part of Fig. 4, it is the non-lenticulated face of the original film F which is directed towards the source, the convergence of this film may again be positive or negative. The additional lenses A and B still continue whether one or both are necessary, in their known functions pointed out above. However, the same argument (interposing the optical centres of the chambers of the lenticulations and the image $S_1$ in its path) always applies for defining the points of the silver image of the original which are at any moment transmitted to the copy.

In particular, it is seen that, for a path of the image of S corresponding to the crossing of the extension of the elementary beam of aperture $\alpha$, the elementary image $h$ of one chamber $e$ is entirely swept, and that, at any position $S_2$ of this image on its path such that it appears viewed from O, the microscopic images which are transmitted from the film F to the film F' are those which define directions $I'_1e_1$, $I'_2e_2$, etc., passing through $S_2$, through the optical centres of the adjacent chambers $e_1e_2$, etc., and bearing on points I'₁I'₂, etc., which may be situated in the interior of the image D' of D.

It has been said above that the slot S had to be arranged between the film F and the source of light D. The nearer the position of the plane R, in which S is movable, is to D, the nearer is the image S' of S in the assembly of the optical system, included between D' and the copy film F', to D'. It may happen therefore, and particularly in the case where the rear face of the optical system O is rather near to F', that the copying slot, in the screen R', is situated in the interior of the optical system O.

This arrangement does not conflict in any manner with what has been stated above in pointing out that no diaphragm, movable or not, in the principal optical system acts to reduce its utilizable aperture.

It is seen in a general manner that the further the slot S' is from F', the greater the risk of parasitic luminous beams, arising from reflections for example, introducing between the screen R' and the copy film, disturbances in the recording of this film F' by illuminating more or less of the zones on this film other than the zone H'.

This risk may be avoided by arranging in proximity to the copy film, in order to protect it from any parasitic harm, a second screen R" (of aperture approximately equal to H') which at any moment accompanies the zone H' in its displacement homothetic with that of S'. It is sufficient for a simple mechanical connection (not shown) to ensure the homothetic displacements of R' and R", the centre of homothety being the centre of the image D' at the distance from the film F', where this image is viewed, which is the emergent pupil of the optical system O.

A similar precaution may possibly be taken on the side of the original, but for a different purpose.
pose.

The copy film being thus equipped, copying conditions may have to be satisfied, according to which, whatever the enlargement between the macroscopic images of the films and, in particular, for the individual enlargement, it is necessary to ensure for the elementary beams of the copy film an aperture different from that of the original film. This case may be that where the original has been taken with a smaller aperture of the optical view-taking system (and with a smaller colour filter in the case of colour films) than the maximum useful aperture permitted by the goffering of the film, for the purpose of giving more field depth to this objective (and of reducing the coloured fringes in the case of colour films).

In copying, without losing new qualities acquired by the original film, it may be of interest to cover entirely the emulsion of the elementary chambers, so as to obtain copy films which are projected under the best conditions of luminous efficiency and to ensure to the whole of the film copy, proceeding from various portions of original film, the same aperture, that is, to ensure its correct projection with a constant aperture of the projecting optical system employed (with the same filter in the case of colours), the distance of convergence being, on the other hand, maintained constant.

The present invention allows of solving this problem in a manner which is very simple and particularly characteristic of the method.

It is a question, for instance, of obtaining a copy film, the elementary beams of which must be more open than those of the original. There is then arranged integral with the screen R", movable with it and occupying the width of its window H', a divergent cylindrical lens U of generatrices parallel or substantially parallel to the edges of the slot S'; this lens produces, when viewed from the film F', an image S" of S' nearer than S'. Consideration of Fig. 4 clearly shows that the aperture of the elementary beams recorded on F' is increased substantially in the proportion of the variation of the angle at which S' viewed the window of R", to that at which S" views the same window.

On the other hand, S" always remains on the same straight line which joins the image of I' to the centre M' of H'; it is understood that, under these conditions, the distance of convergence of F' does not vary.

In the same manner, to reduce the aperture of the elementary beams of the copy film, a lens U may be employed which is movable with R" but convergent.

Fig. 5 illustrates a modification of this device, particularly applicable to the case of colour films taken and to be projected with trichrome filters. In this modification, the lens U is replaced by a system of prisms P₁ and P₂ with edges parallel to the slot S' and by a lens G with parallel faces, of thickness equal to the mean thickness of the prisms. The three elements of this optical device respectively occupy, in front of the zone H', illuminated at any moment, of the film F', the spaces where there is projected through S' the image of each of the three zones of the emergent pupil which themselves correspond to the three zones of the trichrome filter which will have to be employed by projection. If the apices of the prisms P₁ and P₂ are directed towards the lens G, the system effects an enlargement of the aperture of the elementary beams recorded on F'; if, on the contrary, these apices are directed towards the outer edges of the window of width H' in the screen R", the aperture of the beams is reduced.

In the case where the aperture of the beams of the original has been reduced in view-taking, it is necessary to reduce in a homologous manner the aperture d of the guard D of the active surface of the source. In this case, the image D' of D defining the utilizable aperture of the system O is itself reduced, and advantage may be taken of this fact to give to this image a position, relatively to the optical system O, which is not that which allows utilization of this optical system at the largest aperture, without the emergent pupil of the system ceasing to be viewed, without occultation over the whole of the useful path of S'. It is thereby possible to act on the distance of natural convergence of the film F' in one sense or the other.

Figure 6:
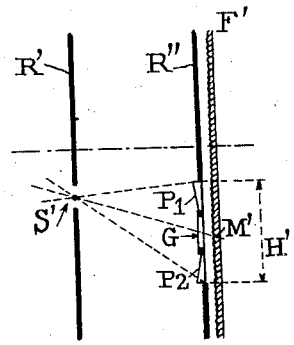
Figs. 6, 7 and 8 illustrate several means adapted to modify the aperture of the luminous beams of the copy.
Figure 7:
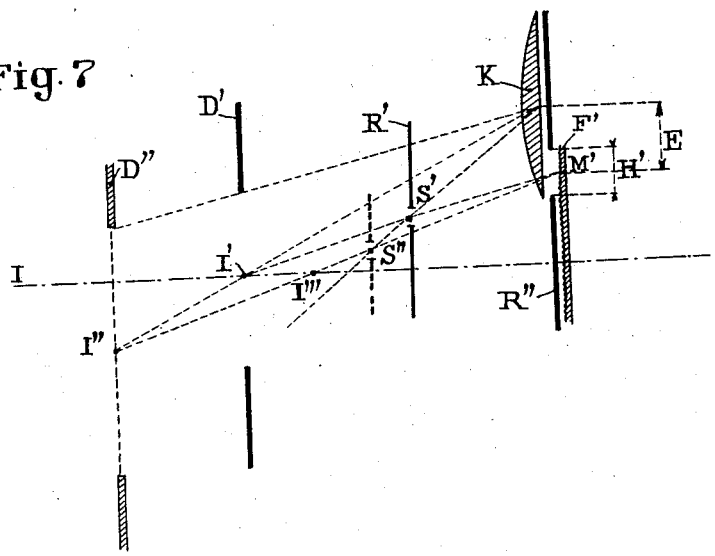
Figure 8:
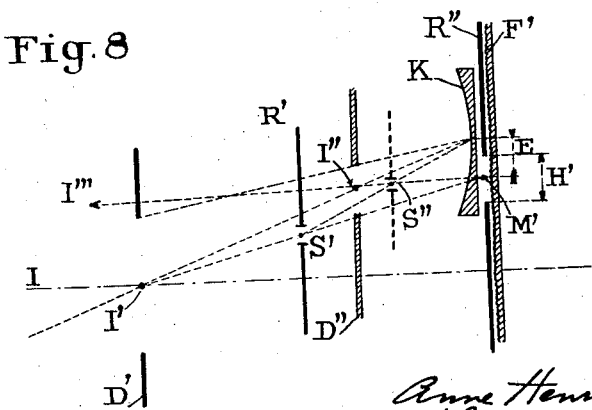

In all cases, it is possible to act on this distance of convergence at the same time as on the apertures of the elementary beams of the copy film F', by the use of movable auxiliary optical systems K in proximity to this film according to the device shown in Figs. 6 and 7. In this device, the auxiliary optical systems such as U or P₁P₂G, shown in Figs. 4 and 5, remain utilizable for the purpose of modifying the aperture of the elementary beams as mentioned above, by their insertion in the screen R". However, in order to act on the distances of convergence, it is possible to work with the aid of another device, also characteristic of the method, by taking advantage of the displacement of the zone H' illuminated at any moment on the surface of the film and producing there the methodical and complete recording of the elementary beams.

Therefore, there is arranged in proximity to the screen R" a convergent or divergent lens K, cylindrical, of generatrices parallel to the slot S', or spherical. In one or the other case, its optical axis is parallel to the principal axis I I' of the principal copying system O, this system not being shown. It is rigidly connected to a mechanism (not shown) which permits it to move with a movement parallel to that of the screen.

When the centre M' of the window H' passes through the principal optical axis I I', the optical axis of K coincides with this principal axis. However, on both sides of this position, the movement of K is such that, for symmetrical positions of H', relatively to this principal axis, the space E existing between the axis of K and M' assumes two equal and symmetrical values, that is, the movement of K, homothetic with that of R", may have a variable amplitude. If it were of the same amplitude, everything would happen as concerns the distance of convergence, as if the lens K did not intervene. It has been seen above that this is the case with the lenses U.

In Figs. 6 and 7, it has been assumed by way of example that the movement was of greater amplitude than that of R". If these figures are considered, it will be understood that E is continuously increasing as H' moves away from the principal axis of the system.

In Fig. 6 let K be such a convergent lens giving for D', the emergent pupil of the system O as viewed from F' before the addition of K, a virtual image for instance at D". This image may be real and on the other side of the film F' without any change being made in the argument.

The straight line I', S' M' which defined at any moment the axis of the elementary beams recorded by F' is replaced by the straight line I", S", M' by geometrical construction of the images of I' and S' furnished by K. This straight line meets the principal axis at a point I''' which defines the modified distance of convergence acquired by the film F' by this new mode of recording, while the aperture of the elementary beams recorded is also modified in a certain measure.

Thus, a movable convergent lens K may newly furnish a distance of convergence of the same sign and shorter than the distance of convergence which would be naturally imparted to the film F', which is plain or only equipped with the optical system U.

On the contrary, a convergent lens, the displacement of which, homothetic with that of R", would be of less amplitude, would furnish a greater and possibly infinite distance of convergence. Its displacement of the same amplitude as R" enables the maintenance without change of the distance of convergence and modifies only as a lens U the apertures of the elementary beams recorded.

Thereby, a new means is obtained of varying the distance of convergence ad libitum and in a possibly continuous manner, by simply acting on a relation of similitude between two movements which remain homothetic, that of R" and that of K.

Fig. 7 illustrates the particular case where the movable lens K is divergent. It is seen that, if its movement is of greater amplitude than that of R", it may newly furnish a distance of convergence which is longer than the distance which would be naturally imparted to the film F', which is plain or only equipped with an optical system U. This figure diagrammatically illustrates the particular case of the collimation of the elementary beams, without the emergent pupil of O being collimated. In effect, for the relation of similitude chosen, this pupil appears no longer at D' but at D" at a still finite distance, but under conditions such that the direction M' I" I''' of the axes of the elementary beams is constantly parallel to the principal axis I I'.

These new means, represented by the lenses U and K, may, of course, be adapted to the case where the optical printer functions as a continuous printer, as set forth above.

I claim:

1. In a system for copying by projection lenticulated films onto films of the same kind, a source of light, a principal optical system situated between said films and containing a diaphragm, shutters, situated one between the original film and the plane in which the axes of the elementary light beams of said film intersect, the other between the copy film and the exit pupil of said optical system, said shutters containing narrow slots parallel to one another and to the direction of the lenticulations of the original film, said films and said slots in said shutters being displaced relatively to one another and remaining optically conjugated, whereby relatively narrow and homologous portions of the two films are simultaneously illuminated and additional fixed optical systems situated on both sides of the original film.

2. In a system for copying by projection lenticulated films onto films of the same kind, a source of light, a principal optical system situated between said films and containing a diaphragm, shutters, situated one between the original film and the plane in which the axes of the elementary light beams of the original film intersect, the other between the copy film and the exit pupil of said optical system, said shutters containing narrow slots parallel to one another and to the direction of the lenticulations of the original film, said films and said slots in said shutters being displaced relatively to one another and remaining optically conjugated, whereby relatively narrow and homologous portions of the two films are simultaneously illuminated additional fixed optical systems situated on both sides of the original film and a fixed additional optical system situated in proximity to the copy film.

3. In a system for copying by projection lenticulated films onto films of the same kind, a source of light, a principal optical system situated between said films and containing a diaphragm, shutters, situated one between the original film and the plane in which the axes of the elementary light beams of the original film intersect, the other between the copy film and the exit pupil of said optical system, said shutters containing narrow slots parallel to one another and to the direction of the lenticulations of the original film, said shutters being displaced in front of said films, said slots in said shutters remaining optically conjugated, whereby relatively narrow and homologous portions of the two films are simultaneously illuminated, the original and the copy film remaining stationary during copying.

4. In a system for copying by projection lenticulated films onto films of the same kind, a source of light, a principal optical system situated between said films and containing a diaphragm, shutters, situated one between the original film and the light source, the other between the copy film and the exit pupil of said optical system, said shutters containing narrow slots parallel to one another and to the direction of the lenticulations of the original film, said original and copy film being displaced continuously and remaining optically conjugated, said shutters being stationary during copying.

5. In a system for copying by projection lenticulated films onto films of the same kind, a source of light, a principal optical system situated between said films and containing a diaphragm, shutters, situated one between the original film and the light source, the other between the copy film and the exit pupil of said optical system, said shutters containing narrow slots parallel to one another and to the direction of the lenticulations of the original film, said films and said slots in said shutters being displaced relatively to one another and remaining optically conjugated, additional fixed optical systems situated on both sides of the original film and an additional shutter close to the copy film, said shutter having an aperture the breadth of which limits at each moment the area of said copy film illuminated by the slots of the first shutter situated in front of said copy film.

6. In a system for copying by projection lenticulated films onto films of the same kind, a source of light, a principal optical system situated between said films and containing a diaphragm, shutters, situated one between the original film and the light source, the other between the copy film and the exit pupil of said optical system, said shutters containing narrow slots parallel to one another and to the direction of the lenticulations of the original film and an additional shutter close to the original film, said shutter having an aperture the breadth of which limits at each moment the area of said original film illuminated by the slots of the first shutter situated in front of said original film.

7. In a system for copying by projection lenticulated films onto films of the same kind, a source of light, a principal optical system situated between said films and containing a diaphragm, shutters, situated one between the original film and the light source, the other between the copy film and the exit pupil of said optical system, said shutters containing narrow slots parallel to one another and to the direction of the lenticulations of the original film, said films and said slots in said shutters being displaced relatively to one another and remaining optically conjugated, additional fixed optical systems situated on both sides of the original film, an additional shutter close to the copy film, said shutter having an aperture the breadth of which limits at each moment the area of said copy film illuminated by the slots of the first shutter situated in front of said copy film and a refracting system lodged in said aperture of said additional shutter, modifying the angular aperture of the elementary beams projected on the copy film without affecting the distance of convergence of the axes of its elementary luminous beams.

8. In a system for copying by projection lenticulated films onto films of the same kind, a source of light, a principal optical system situated between said films and containing a diaphragm, shutters, situated one between the original film and the light source, the other between the copy film and the exit pupil of said optical system, said shutters containing narrow slots parallel to one another and to the direction of the lenticulations of the original film, said films and said slots in said shutters being displaced relatively to one another and remaining optically conjugated, additional fixed optical systems situated on both sides of the original film, an additional shutter close to the copy film, said shutter having an aperture the breadth of which limits at each moment the area of said copy film illuminated by the slots of the first shutter situated in front of said copy film, and a refracting system close to said aperture of said additional shutter and movable at each moment in a direction perpendicular to the slots of the shutter situated in front of the copy film, to modify the distance of convergence of the axes of the beams projected on said copy film.

9. In a system for copying by projection lenticulated films onto films of the same kind, a movable source of light in front of the original film and situated between the said film and the plane in which the axes of the elementary beams of the same film intersect, a principal optical system containing a diaphragm and situated between said films, a movable shutter situated between the original film and the plane in which the axes of the elementary beams of the said film intersect, said shutter comprising two articulated opaque members with a certain spacing between them, said shutter accompanying the light source in its displacement perpendicularly to the lenticulations of the original film, the said light source coinciding with the axis of articulation of the said two opaque members, and a second movable shutter adapted to be displaced between the copy film and the exit pupil of the principal optical system said second shutter remaining optically conjugated with the light source, whereby relatively narrow and homologous portions of the two films are simultaneously illuminated.

10. In a system for copying by projection lenticulated films onto films of the same kind, a movable source of light in front of the original film, a principal optical system containing a diaphragm and situated between said films, a movable shutter situated between the original film and the light source comprising two opaque members with a certain spacing between them, said shutter accompanying the light source in its displacement perpendicularly to the lenticulations of the original film, a second movable shutter adapted to be displaced between the copy film and the exit pupil of the principal optical system and remaining optically conjugated with the light source and an additional shutter close to the copy film, said shutter having an aperture the breadth of which limits at each moment the area of said copy film illuminated by the slots of the first shutter situated in front of said copy film.

11. In a system for copying lenticulated films by projection, a source of light, a principal optical system situated between the original and the copy film, a pair of shutters situated one between the original film and the source of light and the other between the copy film and the exit pupil of said optical system, said shutters containing narrow slots parallel to one another and to the direction of the lenticulations of the original film, said shutters being displaced relatively to one another and remaining optically conjugated, said shutters being so positioned that relatively narrow and homologous portions of the two films are simultaneously illuminated, and additional fixed optical systems situated on both sides of the original film.

12. In a system for copying lenticulated films by projection, a source of light, a principal optical system situated between the original and the copy film, a pair of shutters situated one between the original film and the source of light and the other between the copy film and the exit pupil of said optical system, said shutters containing narrow slots parallel to one another and to the direction of the lenticulations of the original film, said shutters being displaced relatively to one another and remaining optically conjugated, said shutters being so positioned that relatively narrow and homologous portions of the two films are simultaneously illuminated, additional fixed optical systems situated on both sides of the original film, and a fixed additional optical system situated in proximity to the copy film.

13. In a system for copying lenticulated films by projection, a source of light, a principal optical system situated between the original and the copy film, a pair of shutters situated one between the original film and the source of light and the other between the copy film and the exit pupil of said optical system, said shutters containing narrow slots parallel to one another and to the direction of the lenticulations of the original film, said shutters being displaced relatively to one another and remaining optically conjugated, said shutters being so positioned that relatively narrow and homologous portions of the two films are simultaneously illuminated, the original and the copy films remaining stationary during copying.

ANNE HENRI JACQUES DE LASSUS SAINT GENIES.